United States Patent Office 3,195,583
Patented July 20, 1965

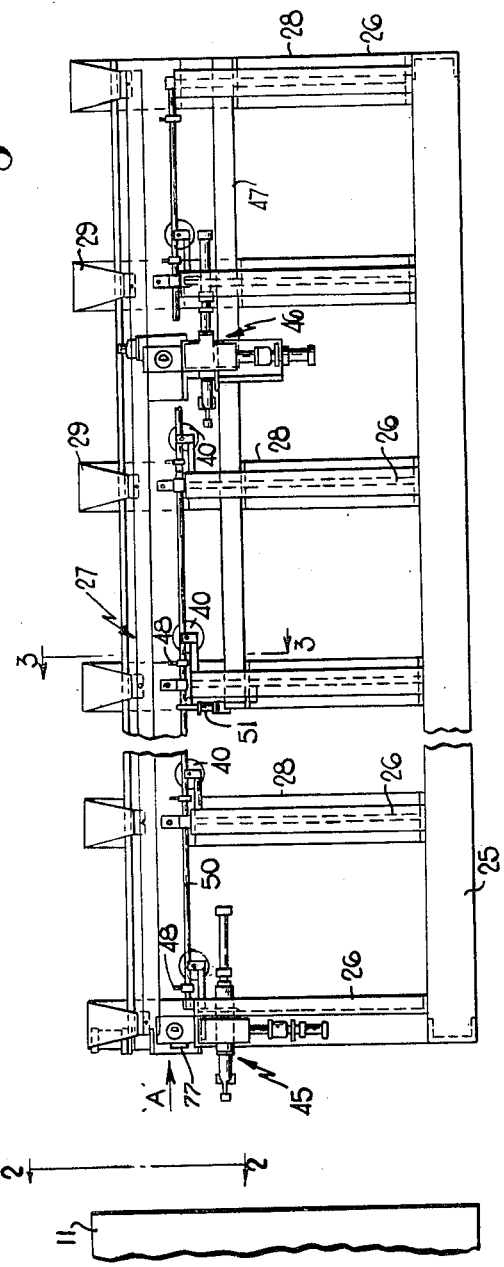

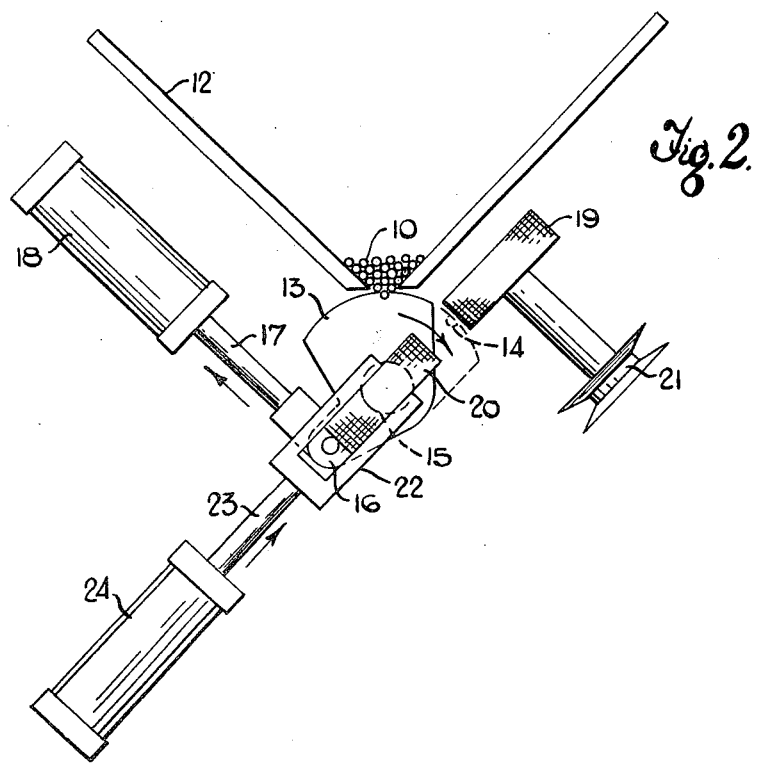

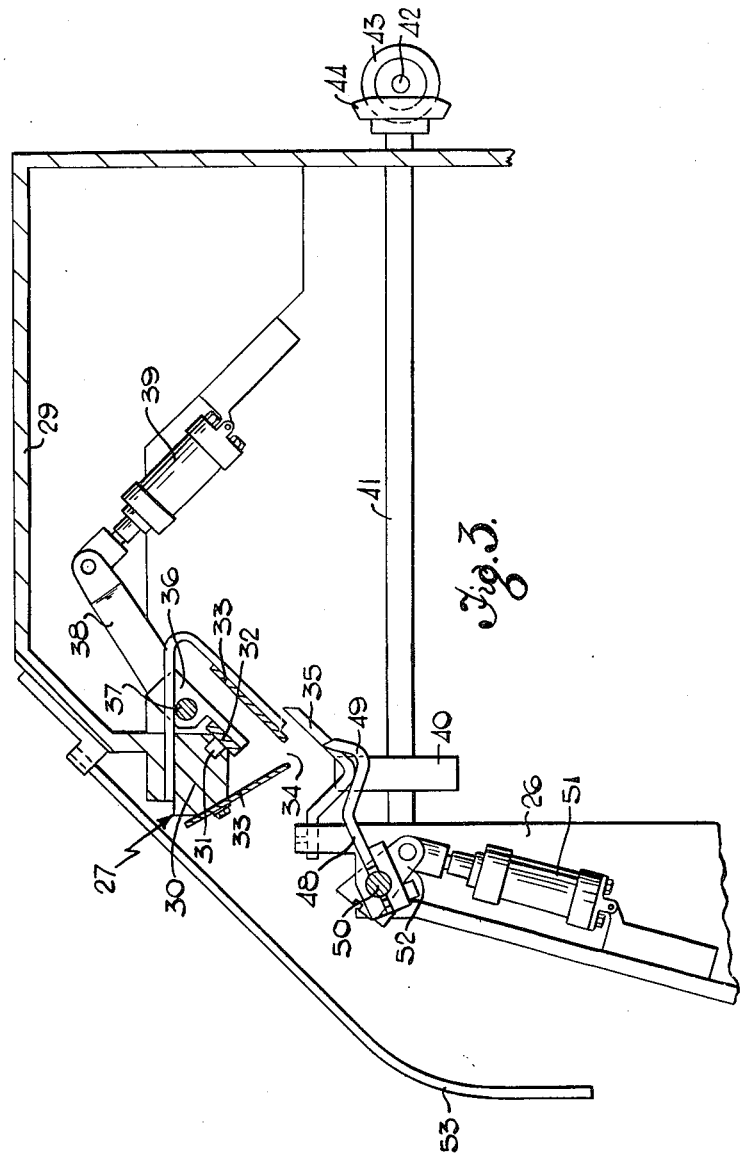

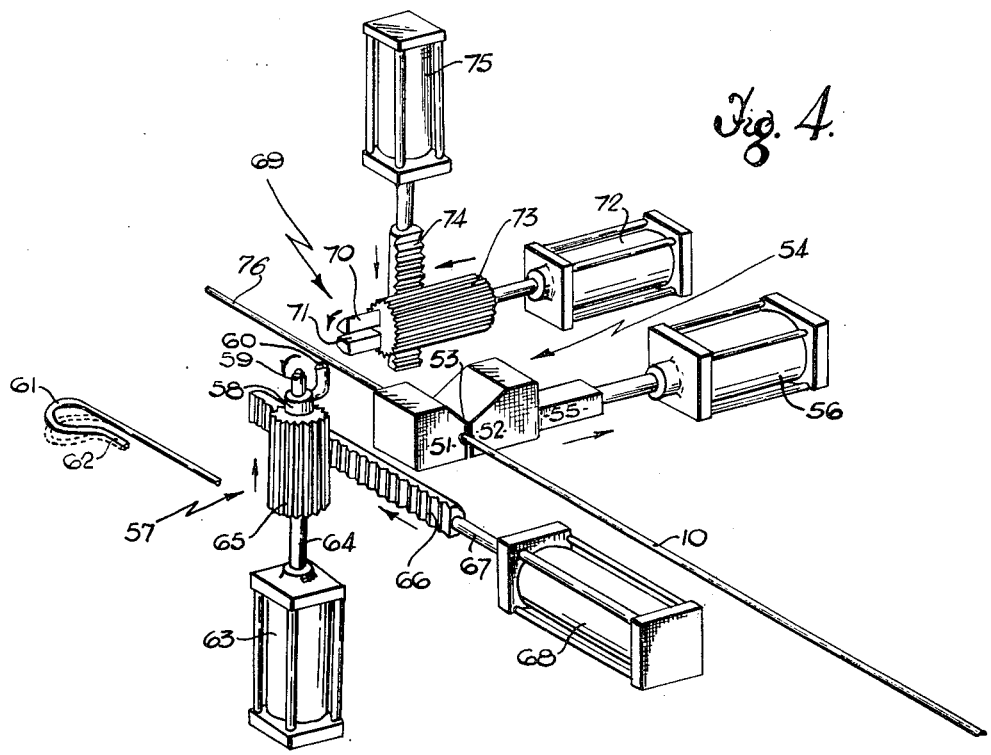

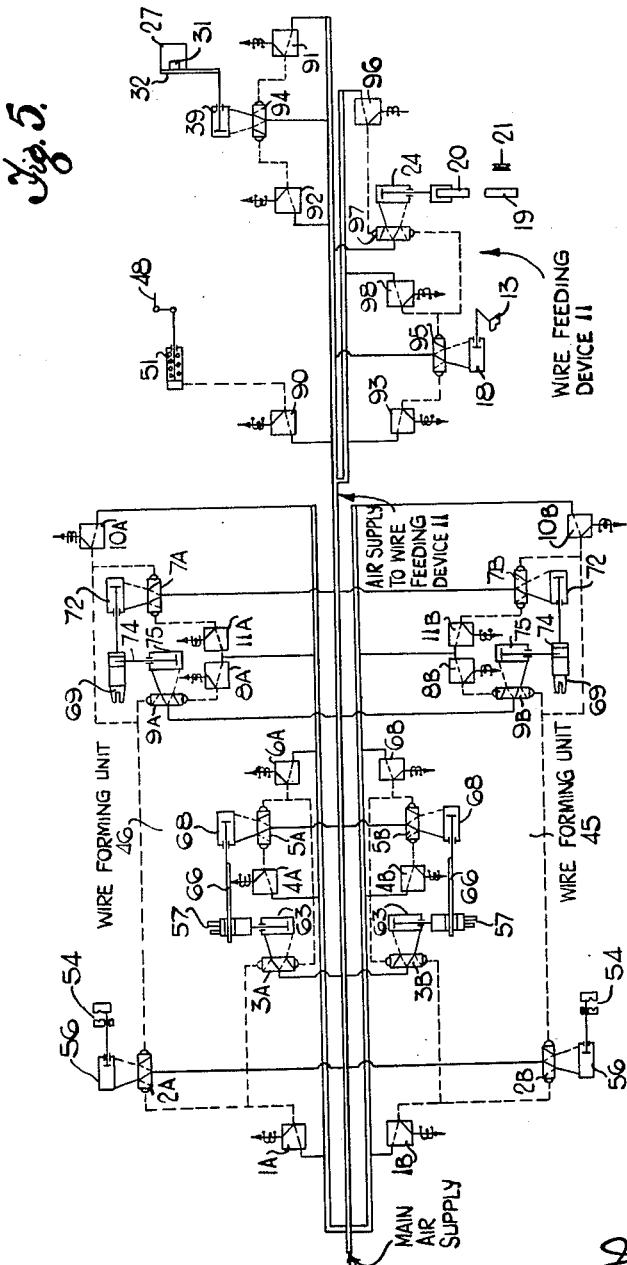

3,195,583
MACHINE FOR PRODUCING WIRE TIES
Maurice Holford Jones, Sutton Coldfield, England, assignor, by mesne assignments, to Fredk. A. Power and Sons Limited, Birmingham, England
Filed Sept. 13, 1962, Ser. No. 223,386
Claims priority, application Great Britain, Sept. 16, 1961, 33,283/61
3 Claims. (Cl. 140—102)

This invention relates to a machine for producing a wire tie wherein at each end of the wire there is formed a loop and a rearwardly extending leg, the loop being bent out of its original flat plane, and in operation the two ends of the wire so formed, are assembled together to form a thief knot.

The object of the present invention is to provide a machine for automatically producing lengths of wire with the ends thereof formed into loops as above described.

According to the invention we provide a machine for producing a wire tie as above referred to comprising support means to hold a predetermined length of wire in a horizontal position, a pair of wire forming units disposed one adjacent each end of the wire, each such unit comprising a jaw assembly to clamp a wire near its ends with a predetermined length projecting free from the jaw assembly, a first forming tool reciprocably and rotatably mounted and arranged to advance, engage the free length of the wire and rotate to form a loop and a rearwardly extending leg, and a second forming tool reciprocably and pivotally mounted and arranged to advance, engage the formed loop and move angularly to bend the loop out of its original plane into a plane inclined to the original.

The invention is illustrated in the accompanying drawings, which show, by way of example, the basic details of a machine constructed in accordance with the invention, and in such drawings:

FIGURE 1 is a view of the machine in side elevation.

FIGURE 2 is a diagrammatic view of the wire feeding device taken on the line 2—2 of FIGURE 1, on the enlarged scale.

FIGURE 3 is an enlarged detail section taken on the line 3—3 in FIGURE 1.

FIGURE 4 is a diagrammatic representation, in perspective, of the essential working parts of one of the wire forming units.

FIGURE 5 is a diagrammatic lay-out of the pneumatic operating circuit of the machine.

Referring to FIGURES 1 and 2, the wires 10 already cut to the required length are fed, one by one, into the machine by the wire feeding device indicated generally at 11 in FIGURE 1 and shown in diagrammatic form in FIGURE 2. The wires feed, one by one, from the device 10 into the machine in the direction of the arrow "A" in FIGURE 1.

The wire feeding device 11 comprises a V-section trough 12 having an opening through which the wires drop in the base of the trough and disposed below the base of the trough is a selector quadrant 13 having a groove 14 which receives one wire at a time from the base of the trough 12. The quadrant 13 is pivotally mounted about a shaft 15 and has an arm 16 connected to the piston rod 17 of pneumatic cylinder 18 which is operated to move the quadrant from the position shown in full lines to the position shown in dotted line in which the selected wire is disposed between a fixed position driven feed roller 19 and a moveable feed roller 20.

Roller 19 is driven by an electric motor (not shown) via pulley 21 and the roller 20 is rotatably mounted in the yoke 22 fixed to the end of the piston rod 23 of the pneumatic cylinder 24 which operates to lift the roller 20 towards the roller 19 so that the wire is gripped between the two rollers and fed forward into the machine for the forming of the ends.

As seen in FIGURE 1 the machine for forming the ends of the wire comprises a base frame 25 which rests upon or is secured to a foundation and upon the base frame a number of upright standards 26 are spaced apart, equidistant, from one end of the frame to the other, and above these upright standards is a feeding trough for the wire, which is indicated generally at 27 is FIGURE 1 and which is shown in enlarged section in FIGURE 3.

At the rear of the machine, as seen in FIGURE 1, there are further upright standards 28 and each of these has a forwardly projecting bracket member 29, and the feeding trough 27 is carried from these brackets.

The feeding trough 27 comprises a bar 30 extending the length of the machine and having a lengthwise slot 31 into which the wire is fed from the feeding device 11. The open mouth of this slot 31 is closed by a flap 32 which, when opened allows the wire to drop downwardly through the gap 34 between the converging guide plates 33 and into the V-shaped supports 35 carried at the upper ends of the standards 26.

The flap 32 is mounted on arms 36 which are fixed to a shaft 37 extending lengthwise of the machine and this shaft is turned to open and close the flap 32 by an arm 38 connected to the piston rod of a pneumatic clyinder 39 fixed at a suitable position in the frame of the machine.

Immediately below the gap 34 of the guide plates 33 each pair of stands 26, 28 has mounted thereon, a rubber covered roller 40 which is rotatable about a horizontal axis and these rollers 40 are driven continuously, each one being mounted on a shaft 41 which extends between the stands 26, 28 and there being a common drive shaft 42 mounted in suitable bearings and extending from end to end of the machine at the rear of the stands. This drive shaft 42 is driven through belt or other gearing from an electric motor (not shown) and has fixed thereon, an appropriate number of bevel gears 43 each of which drives an associated bevel gear 44 at the rear end of a shaft supporting a roller so that all the rollers are driven in unison.

At the left hand end of the machine (see FIGURE 1) the end stand supports a wire forming unit 45 which is fixed in position and at the other end of the machine there is a similar wire forming unit 46 but this is mounted so that it can be adjusted in the horizontal direction and can slide along a suitable slideway 47 supported upon a number of the upright standards at and adjacent this end of the machine. This adjustabie wire forming unit 46 is provided so that the machine can be used for dealing with wire ties varying considerably in length and this adjustable unit will be positioned along its slideway 47 at an appropriate position depending upon the length of wire which is being dealt with.

The construction and operation of both wire forming units is the same and therefore a description of one only is given herewith.

The direction of rotation of the rubber covered rollers 40 is such that when a wire drops from the trough 27 on to the rollers it is moved backwardly in the direction towards the fixed wire forming unit 45 until this end of the wire comes up against a stop plate 77 in this unit 45 which therefore positions this end accurately and also ensures that the other end of the wire is in correct position in relation to the adjustable wire forming unit 46 at the other end of the machine.

As previously mentioned, the opening of the flap 32 in the wire support trough 27 is performed by the pneumatic cylinder 39 which is adapted to operate in synchronism with the operation of the other components which are described hereinafter and all are preferably pneumatically operated in synchronism through a system of relays and solenoids so as to provide fully automatic operation of the machine.

Each upright standard 26 also has pivotally mounted thereon, an ejector finger 48 which has a trough portion 49 near its end resting underneath the wire as it is supported on the rollers 40 and all these ejector fingers are mounted on a common shaft 50 which extends lengthwise of the machine and is rocked by cylinder 51 the piston rod of which is pivotally connected to an arm 52 fixed on the shaft 50. When the ends of the wires have been formed the cylinder 51 operates to raise the fingers 48 so as to lift the wire off the rollers 40 and throw it forwardly away from the machine where it engages the insides of outwardly and downwardly projecting guide fingers 53 which guide it in its vertical descent until it drops into a trough or similar carrier (not shown) extending along the front of the machine.

To initiate the operation of the wire forming units the stop plate in the fixed unit is pivoted so that, when the end of the wire engages it, this plate moves and operates a micro switch which is adapted to actuate a relay and set the cycle of the machine in operation.

Reference is now made to FIGURE 4 which depicts, in diagrammatic form, the construction of one of the wire forming units.

Each wire forming unit has a jaw assembly 54 which comprises a fixed jaw 51 and, in opposition thereto, a slidably mounted movable jaw 52, and the opposed faces of the jaws having grooves providing a channel 53 therebetween into which the end of the wire drops so as to have the correct amount of free length 76 projecting outwardly beyond the jaws. The movable jaw 52 is fixed to a block 55 attached to the end of the piston rod of a pneumatic cylinder 56 whereby reciprocating movement of the piston rod causes opening and closing movement of the movable jaw.

The jaws are mounted upon a horizontal flat platform in the unit and immediately outside the ends of the jaws there is located the first forming tool 57 which comprises a cylindrical head 58 mounted with its axis vertical and slidable up and down through a circular opening in the platform, the upper face of this head having a first peg 59 projecting vertically upwards upon its centre line and a second peg 60 projecting vertically upwards from a position on its periphery, the gap between the two pegs 59 and 60 being aligned with the channel 53 between the two jaws so that as the head 58 rises the pegs engage one on each side of the projecting free end 76 of the wire 10.

This head 58 is adapted to be raised vertically to engage the pegs 59 and 60 with the wire and is then given a rotational movement to form the wire into a loop 61 with a free leg 62 projecting rearwardly and the vertical up and down movement is performed by a pneumatic cylinder 63 whilst the rotational movement is performed by rack and pinion gearing as hereinafter described.

The pneumatic cylinder 63 for operating the head 58 is disposed below the aforesaid platform and its piston rod 64 has secured to its end a cylindrical member formed on its periphery with suitable gear teeth 65. The head 58 is carried by this toothed cylindrical member.

The rack 66 for causing rotation of the head 58 is attached to the projecting end of another piston rod 67 projecting from a further pneumatic cylinder 68 this cylinder being disposed so that its axis is horizontal whereby reciprocation of its piston will produce an angular rotation of the aforesaid head 58 by virtue of the engagement between the rack 61 and toothed cylindrical member 65.

The second forming tool 69 has a bifurcated head 70 providing a slot 71 in the horizontal plane between a pair of arms so that after the wire has been formed into the loop 61 this bifurcated head 70 advances to engage the loop 61 within the slot 71 and then the head 70 is given a small angular movement to bend the loop out of its original plane into the desired inclined plane (as shown in dotted lines).

The bifurcated head 70 is operated in a similar manner to the head 58 of the first forming tool being reciprocated by piston from a pneumatic cylinder 72 moving a toothed cylindrical member 73 which is given an angular rotation by means of rack 74 provided on a piston rod which extends from a vertically disposed pneumatic cylinder 75.

In operation a cut length of wire 10 is delivered by the feeding device into the trough 27 of the machine and in timed sequence the flap 32 of the trough is opened to drop the wire on to the rubber covered rollers 40 which are continuously rotating and which move the wire until it engages the pivoted stop plate in the fixed unit 45; this engagement actuates the micro switch which initiates the sequence of operations of the two forming units 45 and 46.

In each forming unit the head of the first forming tool 57 then moves upwardly and is rotated angularly to form the loop 61 and rearwardly extending leg 62 after which it retracts, whereupon the head of the second forming tool 69 advances to engage the formed loop 61 and then moves angularly to bend this loop into its inclined plane. After the second tool 69 retracts the ejector fingers 48 operate to lift the formed wire tie off the rollers 40 and eject it out of the machine.

The pneumatic and electrical system for controlling the operating cycle of the machine does not form part of the invention and the following brief description, with reference to FIGURE 5, is given by way of example to illustrate the general lay-out only of a suitable control system, the details of which will be well understood by those skilled in this art.

After the wire has dropped on to the rollers 40 and the pivoted stop plate 77 in the unit 45 has operated the micro switch, a relay system is energised which includes a delay relay to allow the wire time to settle before the clamping jaws 54 are closed.

The electromagnetic air valve 1A and 1B then become energised and cause operation of the air valve 2A, 2B and 3A, 3B, thus causing closing of the jaws 54 and raising the first forming tools 57 for the pins to embrace the wire. At the upper positions of the tools 57 certain electrical contacts (not shown) are made and others are broken and then the electromagnetic valves 4A and 4B are energised to operate air valves 5A and 5B to cause the tools 57 to rotate and form the wire loops. On completion of the looping further electrical contacts are made to energise the electromagnetic valves 6A, 6B which operate the valves 3A, 3B and 5A, 5B to return the tools 57 to their original positions.

As the tools 57 retract electrical contacts are made to energise the electromagnetic valves 11A, 11B which operate air valves 7A, 7B to advance the second tools 69 to embrace the formed loops in the wire and when the tools are forward contacts are made to energise the electromagnetic valves 8A and 8B to cause air valves 9A, 9B to operate to rotate the tools 69 and bend the wire loops out of their original planes.

On completion of the bending, contacts are made to energise electromagnetic valves 10A, 10B, causing operation of air valves 2A, 7A, 9A and 2B, 7B, 9B to return the tools 69 to their original positions and open the jaws 54. When the jaws are fully open contacts are made which energise electromagnetic valve 90 to operate the ejector fingers 48 and eject the completed wire.

As the ejector fingers operate, contacts operate to return the relay system to its original state and the machine is ready to accept another wire and commence the cycle of operations again.

The operation of the wire feeding device 11 is as follows:

The flap 32 of the trough 27 is opened, to drop the wire out, by the electromagnetic valve 91 which is operated by suitable contacts after a completed wire tie has been ejected and as the ejector fingers 48 return. As the flap 32 opens contacts are operated which cause valve 91 to be de-energised and valve 92 and also valve 93 are energised causing the air valve 94 to operate and close flap 32 and also causing air valve 95 to operate and move the selector quadrant 13 to take a wire 10 in between the rollers 19 and 20. When the quadrant is forward contacts are made which energise electromagnetic valve 96 which operates air valve 97 and raises the feed roller 20 so that the wire is gripped.

The wire is fed into the slot 31 in the trough 27 of the machine and on completion of feeding the rollers 20 and 19 touch and further contacts are made to energise electromagnetic valve 17 and cause operation of valves 95 and 97 to return the selector quadrant 13 and lower the feed roller 20.

What I claim then is:

1. A machine for bending each end of a straight wire to produce a wire tie, the machine comprising support means for supporting the wire horizontally and two bending units spaced apart to engage the end portions of the wire, each bending unit comprising a jaw assembly to clamp the wire at a predetermined distance from the extremity of the adjacent end portion, a loop-forming tool with two spaced wire-engaging projections and rotatable on an axis at right angles to the wire for bending into a loop the end of the wire extending beyond the jaw assembly and between the projections, said loop-forming tool being reciprocal in the direction of its axis of rotation to move the projections into and out of engagement with the wire, and a loop-bending tool with a loop-receiving bifurcation for receiving the formed loop and rotatable on an axis at right angles to the axis of rotation of the loop-forming tool and to the wire for bending the loop out of its original plane, the loop-bending tool being reciprocal in the direction of its axis of rotation to move the bifurcation into and out of engagement with the loop, and means for moving the loop-forming tool out of its engagement with a loop and for thereafter moving the loop-bending tool into engagement with the loop.

2. A machine as claimed in clame 1, in which the support means comprises a plurality of spaced apart driven rollers aligned along the length of the wire with their axes parallel and horizontal, there is provided an elongated wire receptacle extending horizontally above the driven rollers with a lower opening and pivotally mounted closure flap for the opening, guides below the receptacle to direct on to the rollers a wire released from the receptacle by the flap, and on one of the bending units a stop plate engageable by an end of the wire moved lengthwise towards the stop plate by frictional engagement with the driven rollers, to locate the wire relatively to the bending units.

3. A machine as claimed in claim 1, including means for feeding wires singly and lengthwise into the machine, said means comprising a horizontal trough extending towards said support means with an elongated base opening, a quadrant pivotally mounted on an axis below and parallel with the base opening, the quadrant having an arcuate face extending across the base opening and with a wire-receiving slot, the quadrant being reciprocal on its axis to carry a wire in said slot from below said base opening to a delivery position and subsequently to return said slot to below said base opening, in the delivery position a driven feed roller on a fixed horizontal axis at right angles to the axis of the quadrant and a free feed roller having its axis parallel to the axis of the driven feed roller, and means for moving the free feed roller towards the driven feed roller to engage between the peripheries of the feed rollers a wire in said slot at the delivery position and thereby to feed the wire lengthwise towards said support means.

References Cited by the Examiner

UNITED STATES PATENTS

| | | | |
|---|---|---|---|
| 689,488 | 12/01 | Smith et al. | 140—102 |
| 721,567 | 2/03 | Kelley et al. | 140—102 |
| 980,499 | 1/11 | Denning | 140—27 |
| 1,212,437 | 1/17 | Bates | 140—104 |

CHARLES W. LANHAM, *Primary Examiner.*